(12) United States Patent
Nayak et al.

(10) Patent No.: US 10,386,245 B2
(45) Date of Patent: Aug. 20, 2019

(54) FABRY-PEROT BASED TEMPERATURE SENSING

(71) Applicant: Halliburton Energy Services, Inc., Houston, TX (US)

(72) Inventors: Aditya B. Nayak, Houston, TX (US); James M. Price, The Woodlands, TX (US); David L. Perkins, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/532,000

(22) PCT Filed: Apr. 14, 2016

(86) PCT No.: PCT/US2016/027546
§ 371 (c)(1),
(2) Date: May 31, 2017

(87) PCT Pub. No.: WO2017/180129
PCT Pub. Date: Oct. 19, 2017

(65) Prior Publication Data
US 2018/0188116 A1  Jul. 5, 2018

(51) Int. Cl.
*G01K 11/00* (2006.01)
*G01K 5/48* (2006.01)
*E21B 47/06* (2012.01)
*G01K 13/00* (2006.01)

(52) U.S. Cl.
CPC ............ *G01K 11/00* (2013.01); *E21B 47/065* (2013.01); *G01K 5/48* (2013.01); *G01K 13/00* (2013.01)

(58) Field of Classification Search
CPC .................. G01K 5/48–72; G01K 11/3206
See application file for complete search history.

(56) References Cited

U.S. PATENT DOCUMENTS

| | | | |
|---|---|---|---|
| 4,945,230 A * | 7/1990 | Saaski | G01D 5/268 250/226 |
| 5,392,117 A | 2/1995 | Belleville et al. | |
| 5,754,293 A * | 5/1998 | Farhadiroushan | G01D 5/35383 356/478 |
| 6,056,436 A * | 5/2000 | Sirkis | G01K 11/3206 356/32 |
| 6,950,233 B1 | 9/2005 | Dijaili et al. | |

(Continued)

FOREIGN PATENT DOCUMENTS

| | | |
|---|---|---|
| EP | 0800643 B1 | 4/2003 |
| WO | WO 2010/068870 A2 | 6/2010 |

(Continued)

OTHER PUBLICATIONS

International Search Report and the Written Opinion of the International Search Authority, or the Declaration, dated Jan. 12, 2017, PCT/US2016/027546, 16 pages, ISA/KR.

(Continued)

*Primary Examiner* — Clayton E. LaBalle
*Assistant Examiner* — Leon W Rhodes, Jr.
(74) *Attorney, Agent, or Firm* — Haynes and Boone, LLP

(57) ABSTRACT

Fabry-Perot based optical computing devices and temperature sensors are disclosed for a number of applications including, for example, in-situ downhole fluid analysis and temperature detection.

24 Claims, 10 Drawing Sheets

(56) References Cited

U.S. PATENT DOCUMENTS

| | | |
|---|---|---|
| 7,242,509 B2 | 7/2007 | Atia et al. |
| 7,421,905 B2 * | 9/2008 | Zerwekh ............ G01K 11/3206 374/E11.016 |
| 7,573,578 B2 | 8/2009 | Zribi et al. |
| 7,602,498 B2 * | 10/2009 | Hjelme ................. G01N 21/45 356/480 |
| 2005/0099618 A1 | 5/2005 | DiFoggio et al. |
| 2007/0013911 A1 | 1/2007 | DiFoggio |
| 2007/0153288 A1 | 7/2007 | Wang et al. |
| 2009/0114011 A1 | 5/2009 | Csutak |
| 2011/0264398 A1 | 10/2011 | Niewczas et al. |
| 2013/0062514 A1 | 3/2013 | Csutak |
| 2016/0040513 A1 | 2/2016 | Freitas et al. |

FOREIGN PATENT DOCUMENTS

| | | |
|---|---|---|
| WO | WO 2015/053776 A1 | 4/2015 |
| WO | WO 2015/197920 A1 | 12/2015 |

OTHER PUBLICATIONS

International Search Report and the Written Opinion of the International Search Authority, or the Declaration, dated Dec. 12, 2016, PCT/US2016/027537, 17 pages, ISA/KR.

Masson, et al., "MEMS Tunable Silicon Fabry-Perot Cavity," Proceedings of SPIE vol. 6717, Optomechatronic Micro/Nano Devices and Components III, Oct. 10, 2007.

Parashar, et al., "Three Cavity Tunable MEMS Fabry Perot Interferometer," *Sensors* (Basel, Switzerland), Dec. 2007, vol. 7, No. 12, pp. 3071-3083.

Spectral Sensor Technology http://www.spectralengines.com/learn-more/technology.

* cited by examiner

FABRY-PEROT BASED TEMPERATURE SENSING

PRIORITY

The present application is a U.S. National Stage patent application of International Patent Application No. PCT/US2016/027546, filed on Apr. 14, 2016, the benefit of which is claimed and the disclosure of which is incorporated herein by reference in its entirety.

FIELD OF THE DISCLOSURE

Embodiments of present disclosure generally relate to optical devices and, more particularly, to a Fabry-Perot based optical computing device and temperature sensor.

BACKGROUND

Optical computing devices can be used to analyze and monitor sample substances in real time. Such optical computing devices will often employ a light source that emits electromagnetic radiation that reflects from or is transmitted through the sample and optically interacts with an optical processing element to determine quantitative and/or qualitative values of one or more physical or chemical properties of the substance. The optical processing element may be, for example, an integrated computational element ("ICE"). An ICE can be an optical thin film interference device, also known as a multivariate optical element ("MOE"), which can be designed to operate over a continuum of wavelengths in the electromagnetic spectrum from the UV to mid-infrared ranges, or any sub-set of that region. Electromagnetic radiation that optically interacts with the sample substance is changed and processed by the MOE or other ICE so as to be measured by a detector, such that an output of the detector can be correlated to the physical or chemical property of the substance being analyzed.

DESCRIPTION OF ILLUSTRATIVE EMBODIMENTS

Figure 1:
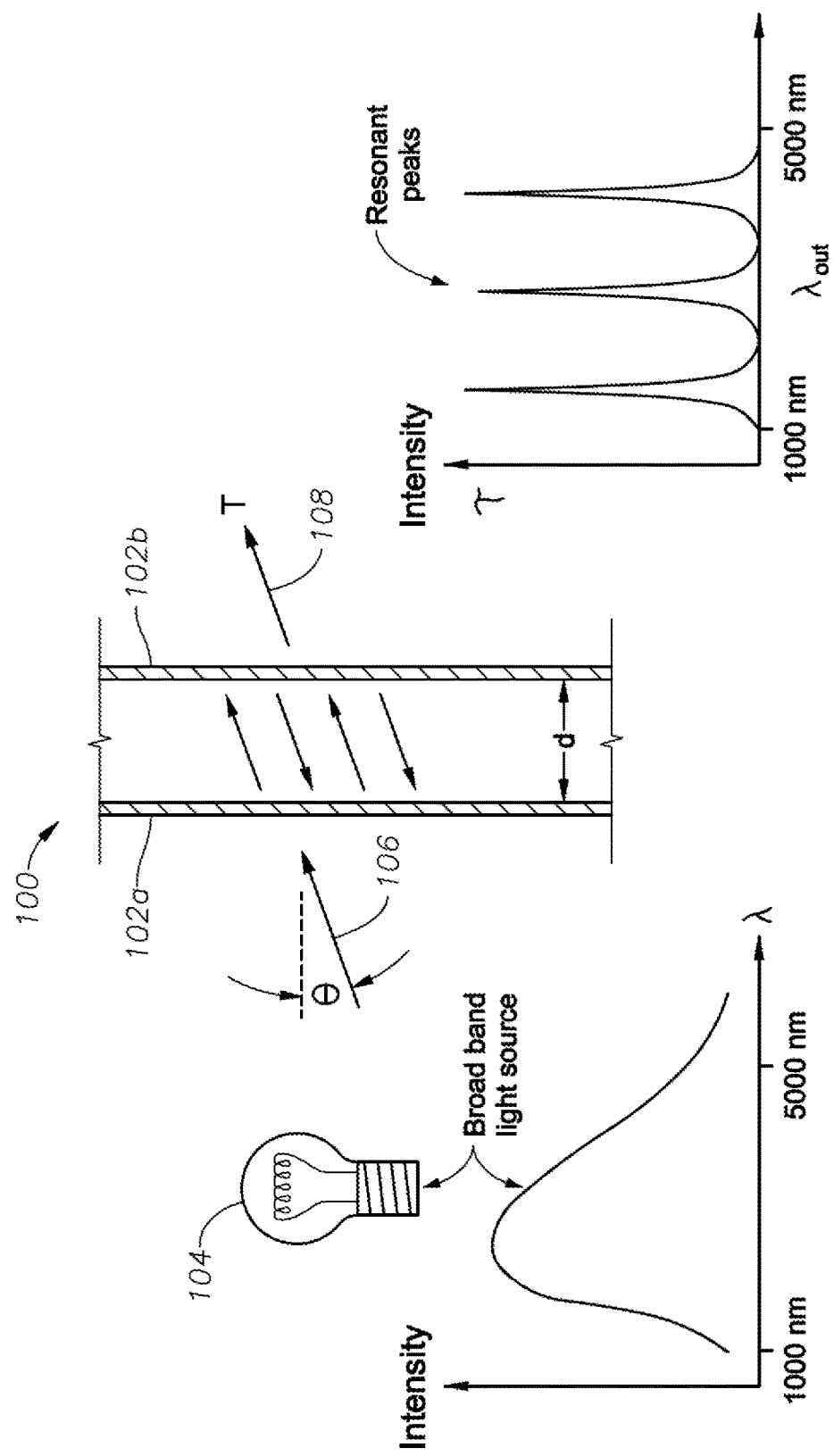
FIG. 1 shows components of a Fabry-Perot interferometer cavity, along with bandwidth regions of the broadband light and the optically-interacted light, useful to illustrate the fundamental concepts of embodiments of the present disclosure.

Illustrative embodiments and related methods of the present disclosure are described below as they might be employed in a Fabry-Perot based optical computing device and temperature sensor for use in a downhole environment. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, embodiments of the present disclosure are directed to Fabry-Perot based optical computing devices and temperature sensors for a number of applications including, for example, in-situ downhole fluid analysis and temperature detection. In a first generalized embodiment, a Fabry-Perot based optical computing device includes a Fabry-Perot cavity having a first and second reflective plate separated from one another by a distance d, which is used to directly create an optical transmission function as the cavity interacts with electromagnetic radiation. A plurality of micro-electromechanical system ("MEMS") building blocks are positioned along one of the reflective plates. By stimulating the MEMS building blocks during operation, the distance between the reflective plates is varied, which in turn varies the resulting optical function such that it mimics a desired regression vector of a sample characteristic of interest, which is ultimately used to determine the sample characteristic of interest.

In a second alternative generalized embodiment, a Fabry-Perot based optical computing device includes a Fabry-Perot cavity in which one of the reflective plates has a stepped profile. Thus, there are different distances (d) along the cavity which create a variety of optical transmission functions. As a result, the output of the Fabry-Perot cavity mimics a variety of regression vectors of sample characteristics, which are ultimately utilized to determine sample characteristics of interest.

In a generalized embodiment of a Fabry-Perot based temperature sensor, the Fabry-Perot cavity includes a temperature sensitive layer along one of the reflective plates. During operation, the thickness of the temperature sensitive layer varies due to temperature fluctuations in the environment, which in turn affects the reflected electromagnetic radiation along the cavity. As the electromagnetic radiation reflects from the temperature sensitive layer and the reflective plate on which the temperature sensitive layer is positioned, the interaction results in a first reflected light (reflected from the temperature sensitive layer) and a second reflected light (reflected from the reflective plate). Ultimately, the phase difference of the first and second reflected lights is calculated to thereby determine the temperature.

The illustrative embodiments and associated methods of the Fabry-Perot based optical computing devices and temperature sensors described herein may be utilized in isolation or combined with one another. The Fabry-Perot optical computing devices and temperature sensors described herein may be utilized in a variety of environments. Such environments may include, for example, downhole well or completion applications. Other environments may include those as diverse as those associated with surface and undersea monitoring, satellite or drone surveillance, pipeline monitoring, or even sensors transiting a body cavity such as a digestive tract. Within those environments, the Fabry-Perot optical computing devices and temperature sensors are utilized to detect/monitor various sample characteristics and temperatures, in real time, within the environment.

FIG. 1 shows components of a Fabry-Perot interferometer cavity useful to illustrate the fundamental concepts of embodiments of the present disclosure. Fabry-Perot cavity 100 consists of two parallel reflective plates, 102a and 102b, which are separated from one another by a distance d. Reflective plates 102a,b each comprise a reflective material on their inner surfaces which causes light to reflect between the surfaces along Fabry-Perot cavity 100. A broadband electromagnetic radiation source 104 produces electromagnetic radiation 106 which optically interacts with Fabry-Perot cavity 100 at a certain angle of incidence θ. The intensity and wavelength range of source 104 can be seen in the graph in the lower left hand corner of FIG. 1. Once electromagnetic radiation 106 transmits through first reflective plate 102a, it is then reflected between first and second reflective plates 102a,102b, until some of electromagnetic radiation 106 is transmitted through second reflective plate 102b as optically-interacted light 108.

The intensity of optically-interacted light 108 transmitted through Fabry-Perot cavity 100 at a particular spectral wavelength is related to the distance d between first and second reflective plates 102a,b. On the lower right hand side of FIG. 1 is a graph showing the intensity T of optically-interacted light 108 along a wavelength of interest λ between 1000 nm and 5000 nm. This graph shows the resonant peaks of optically-interacted light 108 as it continuously transmits through Fabry-Perot cavity. The intensity of the transmitted light (optically-interacted light 108), T, can be defined using the Airy Function:

$$T=(T^2/(1-R)^2)[1+((4R)/(1-R)^2)\sin^2((2\pi\eta d \cos\theta)/\lambda)]^{-1} \quad \text{Eq. (1),}$$

where, T is transmittance, R is reflectance, π is 3.14, η is the effective refractive index of the medium in between the two reflective plates, and d is the distance between first and second reflective plates 102a,b. Using Equation 1, the transmission function of Fabry-Perot cavity 100 can be determined for a given distance d and η.

In view of the fundamentals discussed above, illustrative embodiments of the present disclosure manipulate the distance d in order to create resonant peaks across the wavelength range of interest that mimic regression vectors of Integrated Computational Elements ("ICE"). In recent years, ICE technologies have been developed for various applications, including the Oil and Gas Industry in the form of optical sensors (e.g., optical computing devices) on downhole or surface equipment to evaluate a variety of fluid properties. ICEs typically consist of multiple physical layers with different refractive indexes in the film material, wherein their optical or spectroscopic characteristics can be transformed into effective inputs for linear and nonlinear multivariate calibration.

An optical computing device is a device configured to receive an input of electromagnetic radiation from a substance or sample of the substance and produce an output of electromagnetic radiation from a processing element. The processing element may be, for example, an ICE. Fundamentally, optical computing devices utilize optical elements to perform regression calculations, as opposed to the hardwired circuits of conventional electronic processors. In order to process the output data, the computing device may utilize a variety of multivariate analysis techniques such as, for example, standard partial least squares ("PLS") which are available in most statistical analysis software packages (for example, XL Stat for MICROSOFT® EXCEL®; the UNSCRAMBLER® from CAMO Software and MAT-LAB® from MATHWORKS®).

When electromagnetic radiation interacts with a substance, unique physical and chemical information about the substance is encoded in the electromagnetic radiation that is reflected from, transmitted through, or radiated from the sample. This information is often referred to as the substance's spectral "fingerprint." Thus, the optical computing device, through use of the ICE, is capable of extracting the information of the spectral fingerprint of multiple characteristics or analytes within a substance and converting that information into a detectable output regarding the overall properties of a sample. Through the use of regression techniques, the output light intensity of the ICE conveys the information regarding desired characteristics of the analyte of interest.

Figure 2:
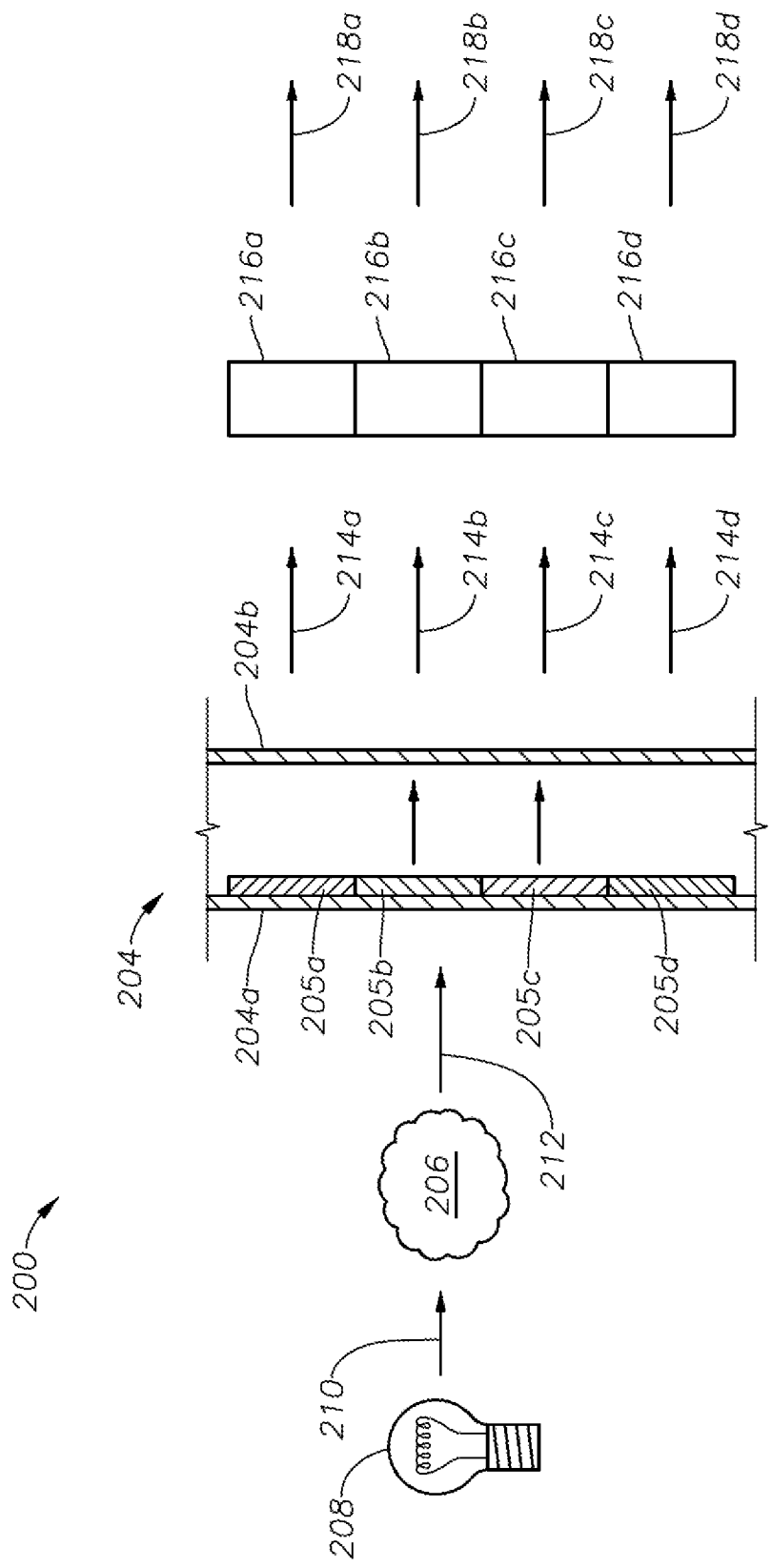
FIG. 2 is a block diagram of a Fabry-Perot based optical computing device according to certain illustrative embodiments of the present disclosure.

FIG. 2 is a block diagram of a Fabry-Perot based optical computing device 200, according to certain illustrative embodiments of the present disclosure. Unlike other embodiments described herein, optical computing device 200 is utilized as a spectrometer which outputs an optical spectrum, as opposed to a specific characteristic or analyte of interest. An electromagnetic radiation source 208 may be configured to emit or otherwise generate electromagnetic radiation 210. As understood in the art, electromagnetic radiation source 208 may be any device capable of emitting or generating electromagnetic radiation. For example, electromagnetic radiation source 208 may be a light bulb, light emitting device, laser, blackbody, photonic crystal, or X-Ray source, natural luminescence, etc. In one embodiment, electromagnetic radiation 210 may be configured to optically interact with the sample 206 to thereby generate sample-interacted light 212. Sample 206 may be any desired sample, such as, for example, a fluid (liquid or gas), solid substance or material such as, for example, hydrocarbons or food products. While FIG. 2 shows electromagnetic radiation 210 as passing through or incident upon the sample 206 to produce sample-interacted light 212 (i.e., transmission or fluorescent mode), it is also contemplated herein to reflect electromagnetic radiation 210 off of the sample 506 (i.e., reflectance mode), such as in the case of a sample 206 that is translucent, opaque, or solid, and equally generate the sample-interacted light 212.

After being illuminated with electromagnetic radiation 210, sample 206 containing an analyte of interest (a characteristic of the sample) produces an output of electromagnetic radiation (sample-interacted light 212, for example). As previously described, sample-interacted light 212 also contains spectral information of the sample used to determine one or more characteristics of sample 206. Although not specifically shown, one or more spectral elements may be employed in optical computing device 200 in order to restrict the optical wavelengths and/or bandwidths of the system and, thereby, eliminate unwanted electromagnetic radiation existing in wavelength regions that have no importance. As will be understood by those ordinarily skilled in the art having the benefit of this disclosure, such spectral elements can be located anywhere along the optical train, but are typically employed directly after the light source which provides the initial electromagnetic radiation.

Although not shown, optical computing device 200 may be coupled to a remote power supply, while in other embodiments optical computing device 200 comprises an on-board battery. Optical computing device 200 may also comprise a signal processor (not shown), communications module (not shown) and other circuitry necessary to achieve the objectives of the present disclosure, as will be understood by those ordinarily skilled in the art having the benefit of this disclosure. It will also be recognized that the software instructions necessary to carry out the objectives of the present disclosure may be stored within storage located on optical computing device 200 or loaded into that storage from a CD-ROM or other appropriate storage media via wired or wireless methods.

Alternatively, however, the processor may be located remotely from optical computing device 200. In such embodiments, a communications link provides a medium of communication between the processor and optical computing device 200. The communications link may be a wired link, such as, for example, a fiber optic cable. Alternatively, however, the link may be a wireless link. In certain illustrative embodiments, the signal processor controls operation of optical computing device 200. Optical computing device 200 may also include a transmitter and receiver (transceiver, for example) (not shown) that allows bi-directional communication over a communications link in real-time. In certain illustrative embodiments, optical computing device 200 will transmit all or a portion of the sample characteristic data to a remote processor for further analysis. However, in other embodiments, such analysis is completely handled by optical computing device 200 and the resulting data is then transmitted remotely for storage or subsequent analysis. In either embodiment, the processor handling the computations may, for example, analyze the characteristic data, or perform simulations based upon the characteristic data, as will be readily understood by those ordinarily skilled in the art having the benefit of this disclosure.

Still referring to the illustrative embodiment of FIG. 2, sample-interacted light 212 is then directed to Fabry-Perot cavity 204, whereby the intensity of the light transmitted therethrough at a particular wavelength is related to the distance between first and second reflective plates 20a and 204b. In this embodiment, a plurality of micro-electromechanical system ("MEMS") building blocks 205a-d are positioned along first reflective plate 204a. Through use of MEMS building blocks 205a-d, the distance d between first and second reflective plates 204a,b is varied in order to change the center wavelength of the transmission resonant peaks created by the Fabry-Perot cavity. When sample-interacted light 212 optically interacts with Fabry-Perot cavity 204, the portion of the light transmitted therethrough reflects between first and second reflective plates 204a and 204b, such that optically-interacted lights 214a-d are generated.

Optically-interacted lights 214a-d are reflected multiple times between the two reflective plates or the Fabry-Perot cavity. A portion of the light (optically-interacted lights 214a-d) exits the Fabry-Perot cavity which is in the form of resonant peaks across the range of wavelengths. Before the light falls on the detector array 216a-d, it goes through a bandpass filter which filters out the harmonic peaks that are not required. The light then falls onto the detector array 216a-d where the intensity of the light is measured at that resonant peak. A resonant peak with high finesse and very low FWHM (Full Width Half Maximum) is desired such that the resonant peaks measure the light intensity only at that particular wavelength. Each MEMS building block 205a-d is tuned to a different wavelength by changing the distance between the two plates. The intensities measured at multiple consecutive wavelengths are used to construct the optical spectrum.

Detector array 216 may be any device capable of detecting electromagnetic radiation, and may be generally characterized as an optical transducer. For example, detector array 216 may be, but is not limited to, a thermal detector such as a thermopile or photoacoustic detector, a semiconductor detector, a piezo-electric detector, charge coupled device detector, video or array detector, split detector, photon detector (such as a photomultiplier tube), photodiodes, local or distributed optical fibers, and/or combinations thereof, or the like, or other detectors known to those ordinarily skilled in the art. Detector array 216 is further configured to produce output signals 218a-d in the form of a voltages that combinatorily correspond to optical spectrum of the sample 206.

Although not shown in FIG. 2, in certain illustrative embodiments, detector array 216 may be communicably coupled to a signal processor (not shown) on-board optical computing device 200. The signal processor may then be configured to computationally combine output signals 218a-d to thereby generate the optical spectrum of the sample. Thereafter, the resulting data is then transmitted to the processor for further operations and/or analysis.

In an illustrative method, Fabry-Perot based optical computing device 200 may be deployed downhole to directly measure the spectrum of a sample. In such a method, although the form factor, resistance to vibration, temperature stability (up to 70° C., for example) and quick measurement time are suitable for the downhole environment, the measurements may not be instantaneous (because multiple wavelength points are measured and then constructed into the entire spectrum, which can take some time), which may affect the accuracy of measurement prediction. Moreover, the stability at the very high downhole temperatures (above 70° C., for example) may be adversely affected.

Figure 3A:
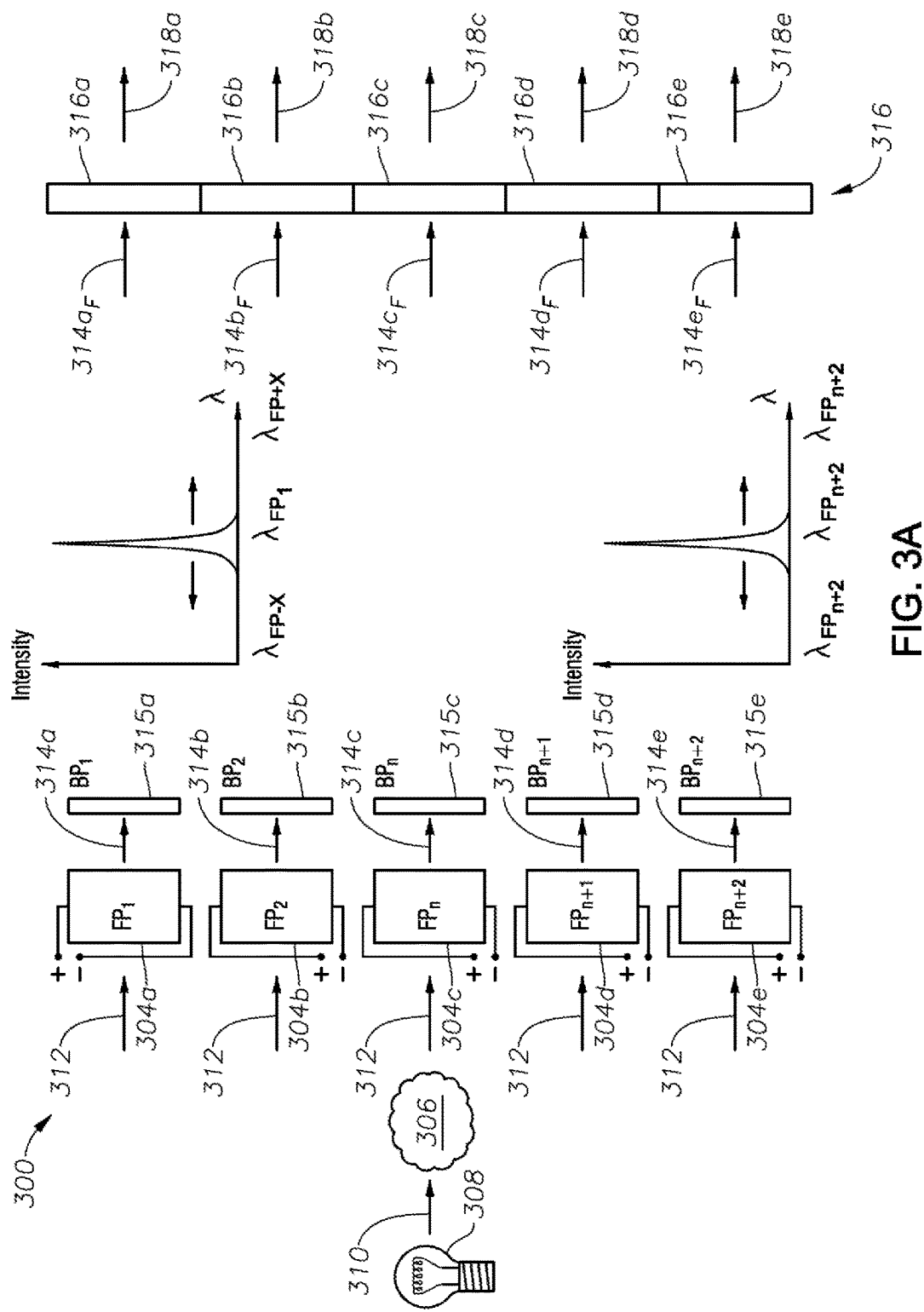
FIG. 3A is a block diagram of a Fabry-Perot micro-electromechanical system based optical computing device, according to certain illustrative embodiments of the present disclosure.

To combat such disadvantages of the embodiment and method of FIG. 2, an alternative Fabry-Perot MEMS based optical computing device 300 is now described, as illustrated in FIG. 3A. As with previous embodiments, Fabry-Perot based optical computing device 300 includes an electromagnetic radiation source 308 which generates electromagnetic radiation 310. Electromagnetic radiation optically interacts with sample 306 to generate sample-interacted light 312. In this figure, the Fabry-Perot cavity is simplistically represented by a plurality of MEMS building blocks 304a-e which are coupled to the first or second reflective plate of the Fabry-Perot cavity. As will be described below, MEMS building blocks 304a-e generate single or multiple peak ICE transmission functions over a broad range of wavelengths.

In FIG. 3A, voltage is applied to MEMS building blocks 302a-e to thereby vary the distance d between the first and second reflective plates to directly create a desired ICE-core transmission function. Although not shown, each MEMS building block 304a-e is communicably coupled to a voltage source/controller. The advantage of using this embodiment over the general embodiment of FIG. 2 is a lesser number of MEMS building blocks. Also, in this example, the spectrum is not being measured. Instead, the detector responses, which are proportional to the analyte concentration, are directly measured. In optical computing device 300, only a few MEMS building blocks are necessary to create spectral peaks (i.e., transmission functions) across the wavelength range of interest that mimic the ICE regression vector.

Figure 3B:
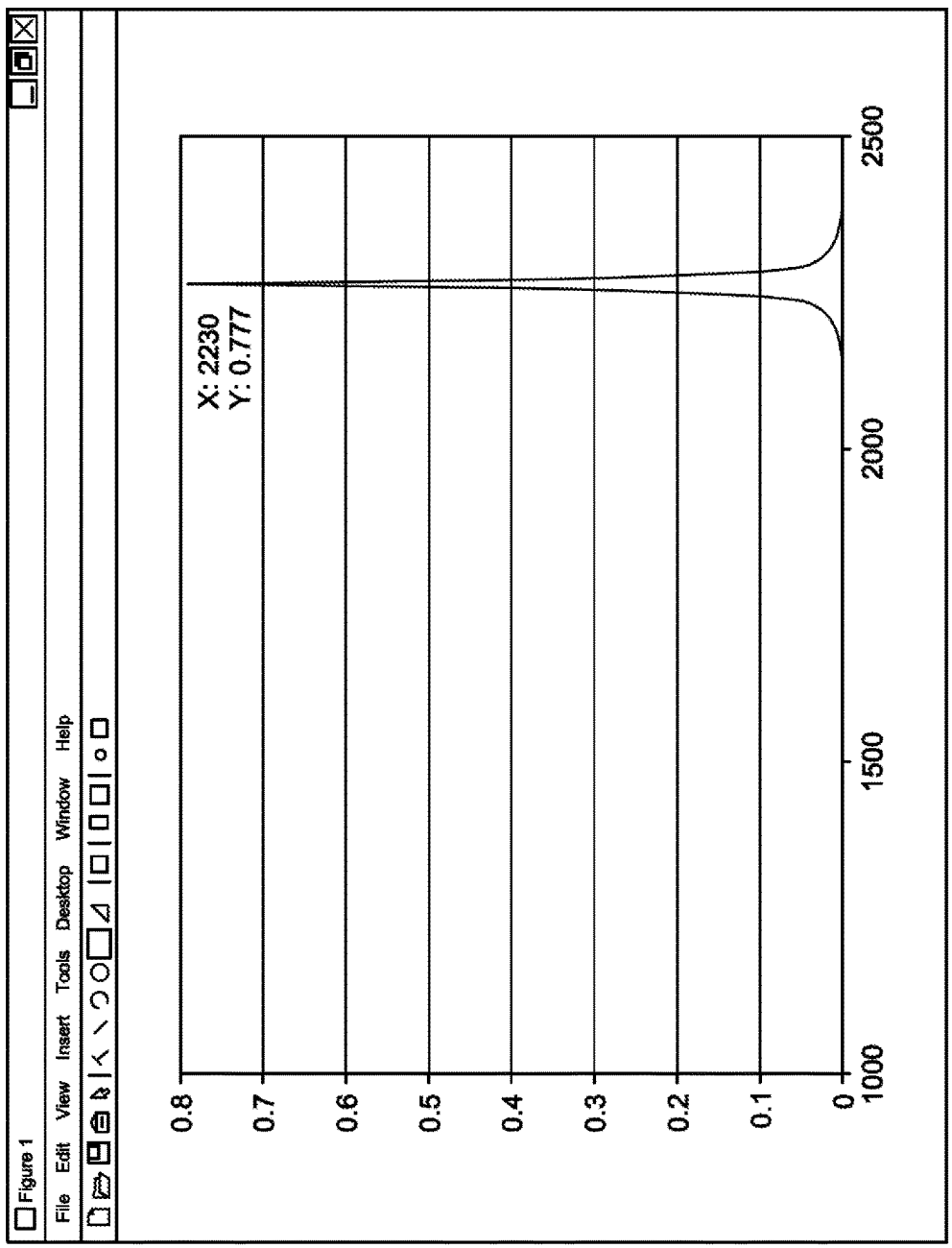
FIG. 3B is a graph of a transmission function for gas-oil-ratio.

As an example, consider an ICE for gas-oil-ratio ("GOR"), whose transmission function is showed in FIG. 3B. The standard error of calibration ("SEC") of this ICE design is 14% (relative, percent full scale) and sensitivity (delAdivB, which is the A channel detector response divided by B channel detector response) is 56% (relative, percent full scale). The center wavelength of the peak is 2258.9 nm. The illustrative transmission profile of FIG. 3B can be achieved using a single MEMS building block (304a, for example). The distance d between the first and second reflective plates may be changed by applying the appropriate voltage to the MEMS building blocks. For example, different voltages may be applied to each MEMS building block 304a-e to thereby create a different transmission function (as illustrated in FIG. 3A) mimicking a different regression vector of a sample characteristic. Also, there are a variety of MEMS building block configurations which may be utilized, as the configurations described herein are only illustrative in nature.

Nevertheless, referring back to FIG. 3A, once sample-interacted light 312 has interacted with the Fabry-Perot cavity (and MEMS building blocks 304a-e positioned therein), optically-interacted lights 314a-e are generated, each light corresponding to a different ICE transmission function across a bandwidth of interest which mimics the ICE regression vector. In order to filter out the undesired harmonic peaks, bandpass filters 315a-e are positioned to optically interact with sample-interacted lights 314a-e. As a result, filtered optically-interacted lights $314a_F\text{-}e_F$ are generated, each having a spectral peak that may be shifted up or down along the bandpass region by manipulating the voltage applied to each MEMS building block 304a-e, as shown by the illustrative transmission functions in FIG. 3A.

A detector array 316 is positioned to measure each filtered optically-interacted lights $314a_F\text{-}e_F$. The detector array 316 includes a plurality of detectors 316a-e, which generate output signals 318a-e corresponding to the intensity of the spectral peaks of each transmission function in filtered optically-interacted lights $314a_F\text{-}e_F$. A processor (not shown) communicably coupled to detector array 316 to combine output signals 318a-e. The processor contains the calibration data, which is used to convert the measured detector response to concentration values for different analytes.

Although Fabry-Perot based optical computing device 300 only generates individual single peak ICE transmission functions, it may be utilized as a spectrometer by integrating the intensities measured at several wavelengths. Alternatively, in other methods, Fabry-Perot based optical computing device 300 may be used as a spectrometer and ICE transmission function generator to improve the analyte prediction. For example, this could be achieved by measuring the spectrum in a certain wavelength range, say from 500-1500 nm and then use the ICE to measure the detector response from 1500-2500 nm. The combined response would improve analyte prediction.

Figure 4:
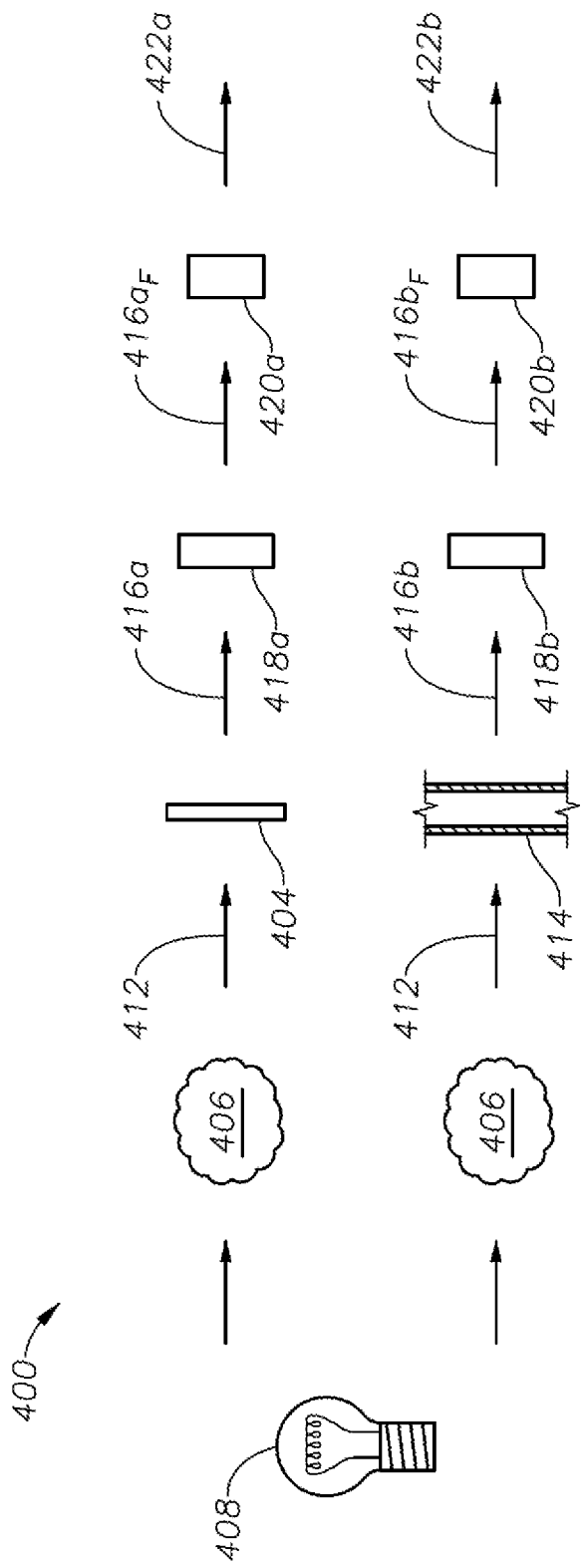
FIG. 4 illustrates a Fabry-Perot based optical computing device which includes one or more Integrated Computational Elements, according to certain alternative embodiments of the present disclosure.

FIG. 4 illustrates a Fabry-Perot based optical computing device according to certain alternative embodiments of the present disclosure. In optical computing device 400, ICE technology is integrated with the MEMS based Fabry-Perot device. In such an embodiment, the combination of the device with ICE improves the combined resolution possibly unattainable by the individual elements alone. With two forms of information, i.e. ICE detector response and spectral data with spectrometer, the resolution of sample characteristic prediction is much better. Typically, when a prediction is made we say that the GOR concentration was 300 GOR units+/−20 GOR Units; with the methods disclosed herein, however, 285 GOR units+/−1 GOR units—which provides much better resolution.

As with previous embodiments, Fabry-Perot based optical computing device 400 includes an electromagnetic radiation source 408 which generates electromagnetic radiation 410. Electromagnetic radiation optically interacts with sample 406 to generate sample-interacted light 412. Sample-interacted light 412 then optically interacts with an ICE array 404 and a Fabry-Perot cavity 414. ICE array 404 is comprised of multiple ICEs selected to produce transmission functions that mimic a desired regression vector of a sample characteristic. ICEs typically consist of multiple physical layers with different refractive indexes in the film material, wherein their optical or spectroscopic characteristics can be transformed into effective inputs for linear and nonlinear multivariate calibration. Many multivariate analysis techniques exist such as, for example, standard partial least squares ("PLS") which are available in most statistical analysis software packages (for example, XL Stat for MICROSOFT® EXCEL®; the UNSCRAMBLER® from CAMO Software and MATLAB® from MATHWORKS®).

Fabry-Perot cavity 414 may be any of the Fabry-Perot cavities described herein. When sample-interacted lights 412 optically interact with ICE array 404 and Fabry-Perot cavity 414, optically-interacted lights 416a,b are generated. As previously described, second optically-interacted light 416b includes a plurality of lights that correspond to single-peak ICE transmission functions of a sample characteristic. Additionally, since ICE array 404 includes a plurality of ICEs, optically-interacted light 416 also includes a plurality of lights corresponding to single-peak ICE transmission functions. Also, the transmission functions generated by ICE array 404 may be the same as or different from those of Fabry-Perot cavity 414. When ICE array 404 generates the same ICE transmission functions, ICE array 404 includes the same number of ICEs as MEMS building blocks in Fabry-Perot cavity 414.

Nevertheless, bandpass filter arrays 418a,b are positioned to optically interact with optically-interacted lights 416a,b in order to filter out the undesired bandpass regions, as previously described, thereby producing filtered optically-interacted lights $416a_F$ and $416b_F$. The detectors forming bandpass filter arrays 418a,b may filter the same or different bandpass regions. Filtered optically-interacted lights $416a_F$ and $416b_F$ are then directed to detector arrays 420a,b, whereby output signals 422a,b are generated accordingly. Output signals 422a,b are then directed to a signal processor (not shown) whereby they ultimately improve the measurement resolution of optical computing device 400, as previously discussed.

Figure 5A:
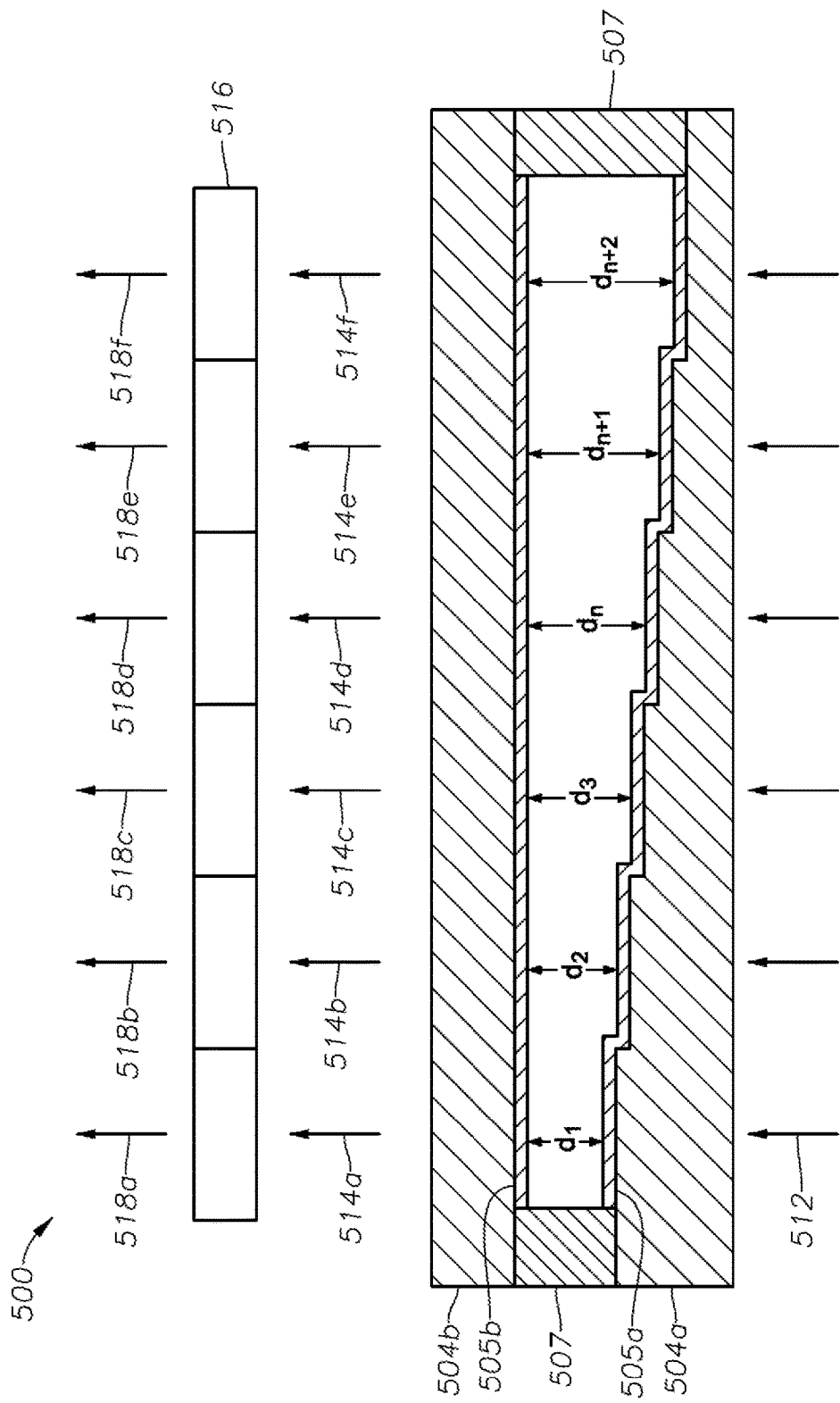
FIG. 5A illustrates a fixed distanced Fabry-Perot optical computing, according to certain alternative illustrative embodiments of the present disclosure.

FIG. 5A illustrates a fixed distanced Fabry-Perot optical computing, according to certain alternative illustrative embodiments of the present disclosure. Here, the MEMS building blocks are replaced with a fixed distance Fabry-Perot interferometer. One advantage of this design is that it is no longer sensitive to temperature cycling and vibrations. Also, the measurement acquisition time is faster because voltage need not be applied to change the distance between the reflective plates, and measurements from all MEMS building blocks are acquired simultaneously. There are a variety of ways in which to manufacture Fabry-Perot based optical computing device 500. In one illustrative method, Fabry-Perot cavity 504 is made by fabricating first and second reflective plates 504a and 504b on a semiconductor chip. A wafer, such as, for example, Si, Ge, GaAs, etc., is etched, for example, in a step-wise fashion to create a stepped profile, as shown along first reflective plate 504a. The wafer material selection depends on the wavelength range of interest. Each step has a height, resulting in a distance $d_1$-$d_{n+2}$, which is selected based upon the desired resolution of the computing device. The distances $d_1$-$d_{n+2}$ may be calculated using the Airy Function of Equation 1 above.

After first reflective plate 504a has been etched, a layer of reflective material 505a and 505b are deposited on the surfaces of first and second reflective plates 504a,b. Reflective material 505a,b may be a variety of materials, such as, for example, Ag or Au. First reflective plate 504a is then mated with a non-stepped (or flat) second reflective plate 504b using separators 507. Each step, along with the reflective materials of the first and second reflective plate may be referred to as Fabry-Perot building blocks. As such, the illustrative embodiment of optical computing device 500 includes six Fabry-Perot building blocks. A detector array 516 made of nGaAs, for example, is positioned adjacent second reflective plate 504b in order to measure the individual intensity of the light emanating from each Fabry-Perot cavity 504.

During operation of fixed distance Fabry-Perot optical computing device 500, electromagnetic radiation is again generated whereby it interacts with a sample (not shown) to produce sample-interacted light 512. Sample-interacted light 512 then optically interacts with Fabry-Perot cavity 504 to produce a plurality of optically-interacted lights 514a-f. Because of the different distances $d_1$-$d_{n+2}$ of the stepped-profile, the optically-interacted lights 514a-f each have different transmission functions that mimic different ICE regression vectors of sample characteristics. Alternatively, however, the transmission functions may mimic the same regression vector of a sample characteristic. Nevertheless, optically-interacted lights 514a-f are then directed to detector array 516, whereby detectors 516a-f produce output signals 518a-f that correspond to the intensity of the transmission functions of optically-interacted lights 514a-f. Although not shown, in some embodiments, a bandpass filter array may be positioned between Fabry-Perot cavity 504 and detector array 516 in order to filter out undesired wavelengths (thereby producing filtered optically-interacted light). A signal processor (not shown) then analyzes output signals 518a-f determine one or more sample characteristics of interest using suitable multivariate analysis methods. Accordingly, fixed distance Fabry-Perot optical computing device 500 may be utilized as a spectrometer or an ICE transmission function generator to improve analyte detection.

Figure 5B:
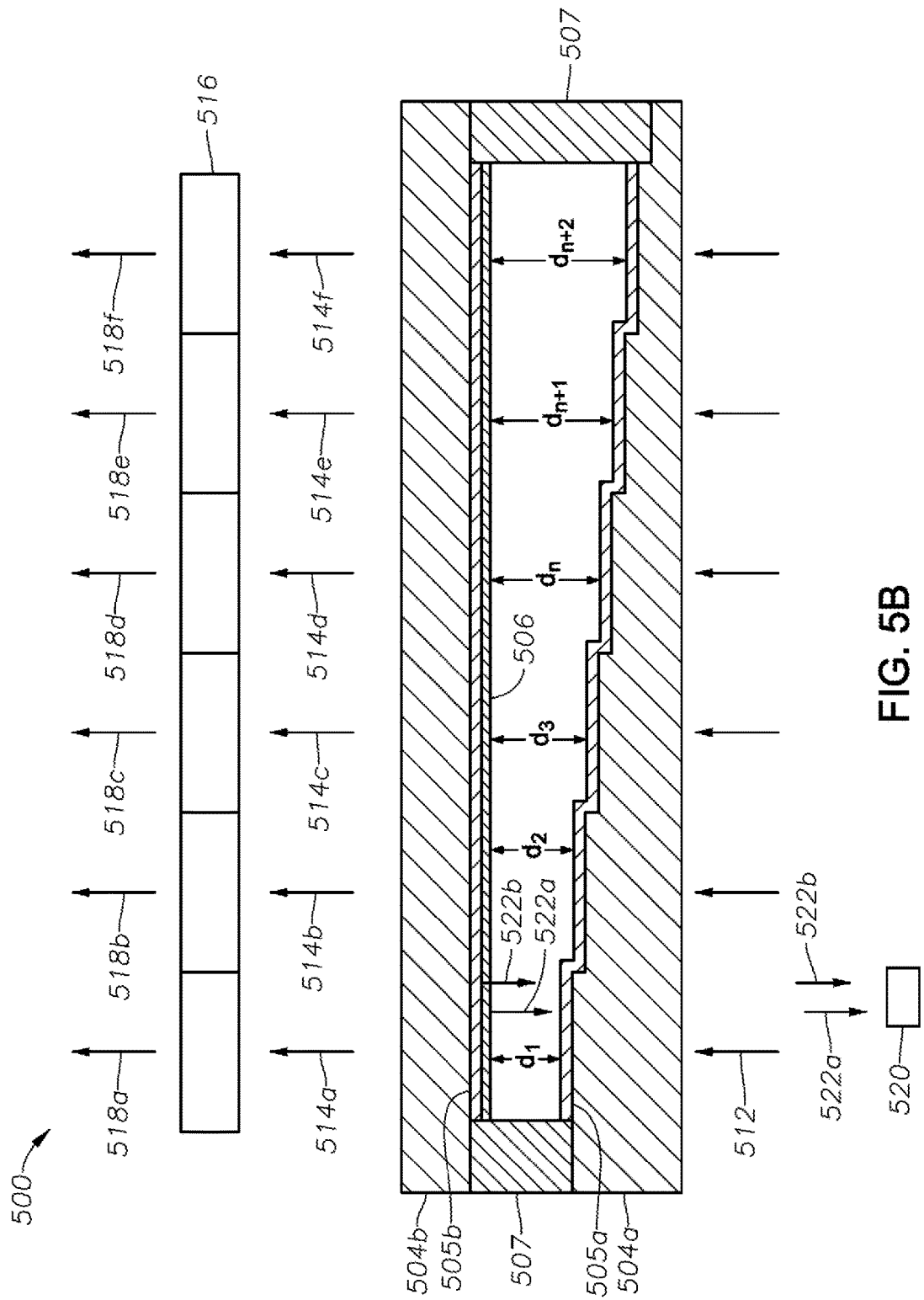
FIG. 5B illustrates an alternate embodiment of fixed distance Fabry-Perot optical computing device, wherein it is also utilized as a temperature sensor

FIG. 5B illustrates an alternate embodiment of fixed distance Fabry-Perot optical computing device 500, wherein it is also utilized as a temperature sensor. In FIG. 5B, Fabry-Perot optical computing device 500' is similar to that of FIG. 5A. However, Fabry-Perot optical computing device 500' includes an optically transparent temperature sensitive layer 506 along second reflective plate 504b. Temperature sensitive layer 506 may be a variety of materials, such as, for example thin-films of c-Silicon, Poly-silicon, Germanium, GaAs etc, which expand/contract based upon the ambient temperature. During operation of Fabry-Perot optical computing device 500', a portion of sample-interacted light 512 that optically interacts with cavity 504 is reflected from temperature sensitive layer 506, and reflects back toward a detector 520. More specifically, a first reflected light 522a is reflected from temperature sensitive layer 506 and a second reflected light 522b is reflected from reflective material 505b. Due to the thickness of temperature sensitive layer 506 atop reflective material 505b, first and second reflected lights 522a,b have a phase difference.

Once first and second reflected lights 522a,b are detected by detector 520, output signals (not shown) are generated and utilized by a processor to calculate the phase difference and correlate it to a temperature reading. This correlation may be performed in a number of ways, such as, for example, correlating temperature to the higher phase, or more time difference between the two signals—which means the thin material is expanding and that the ambient temperature is going up. Similarly, if the phase difference goes down then the thin material is contracting, which means the ambient temperature is going down.

Figure 6:
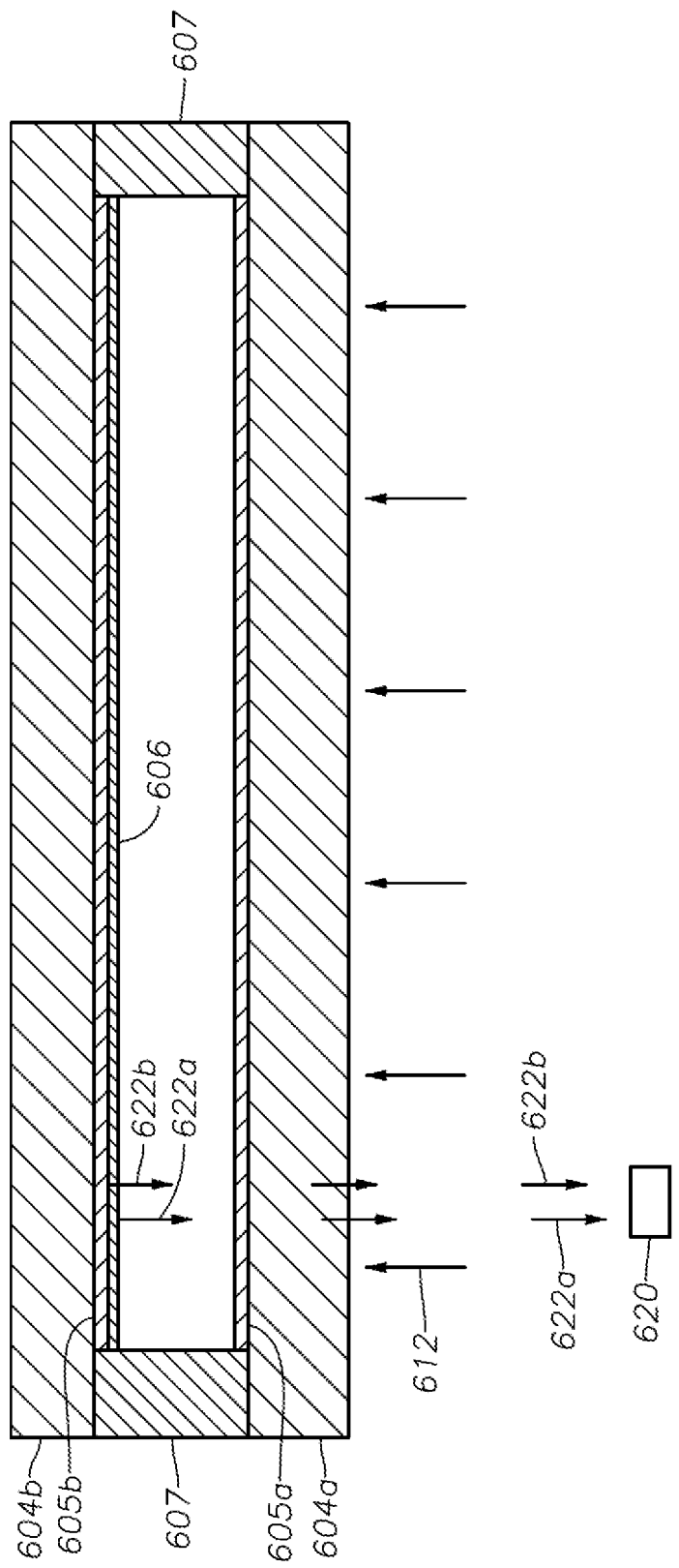
FIG. 6 illustrates a Fabry-Perot based temperature sensor, according to certain illustrative embodiments of the present disclosure.

FIG. 6 illustrates a Fabry-Perot based temperature sensor, according to certain illustrative embodiments of the present disclosure. Fabry-Perot based temperature sensor 600 includes a Fabry-Perot cavity 604, comprised of a first and second reflective plate 604a and 604b, both of which a flat in nature and fabricated using a semiconductor chip. A layer of reflective material 605a and 605b are deposited on the surfaces of first and second reflective plates 604a,b. Reflective material 605a,b may be a variety of materials, such as, for example, Ag or Au. First reflective plate 604a is then mated with second reflective plate 604b using separators 607.

An optically transparent temperature sensitive layer 606 is positioned along second reflective plate 604b. Temperature sensitive layer 606 may be a variety of materials, such as, for example thin films of c-Silicon, Poly-silicon, Germanium, GaAs etc, which expand/contract based upon the ambient temperature. During operation of Fabry-Perot based temperature sensor 600, a portion of sample-interacted light 612 (or some other electromagnetic radiation) that optically interacts with cavity 604 is reflected from temperature sensitive layer 606, and reflects back toward a detector 620. More specifically, a first reflected light 622a is reflected from temperature sensitive layer 606 and a second reflected light 622b is reflected from reflective material 605b. Due to the thickness of temperature sensitive layer 606 atop reflective material 605b, first and second reflected lights 622a,b have a phase difference which, as discussed above, is analyzed to determine the temperature.

In an alternative embodiment, Fabry-Perot based temperature sensor 600 may include a bandpass filter positioned between cavity 604 and detector 620. In such an embodiment, the bandpass filter's edge may be utilized to cut through the resonant peak created by Fabry-Perot cavity 604. For example, if the Fabry-Perot building block creates a resonant peak centered around 2500 nm with FWHM (full width at half maximum) at 20 m, the resonant peak is about 40 nm wide centered around 2500 nm. Now consider that the bandpass filter also has an edge at 2500 nm. First and second reflected lights 622a and 622b will have an intensity of x. When the ambient temperature rises, the resonant peak of first reflected light 622a may shift from 2500 nm to 2505 nm, for example. However, the bandpass filter edge will not move as much. Thus, the new intensity of first reflected light 622a will have an intensity of say, x minus some value. After the first and second reflected lights 622a,b are detector by detector 620, one or more signals are generated accordingly, which are then utilized to determine the temperature.

In other embodiments, the features of Fabry-Perot temperature sensor 600 may be combined with any other Fabry-Perot based designed described herein, and vice versa. For example, one or more of the Fabry-Perot temperature sensor, ICE, Fabry-Perot MEMS building block cavity, or fixed distance Fabry-Perot cavities may be combined with one another. In those embodiments combining the temperature sensitive layer and MEMS building blocks, the temperature sensitive layer can be place only on one building block, while the remaining building blocks are MEMS building blocks. In addition, although the temperature sensitive layers are described as being positioned along the second reflective plate, they may also be positioned along the first reflective plate, as the embodiments of the computing devices and temperature sensors described herein are illustrative in nature. These and other features may be combined as desired without departing from the spirit and scope of the present disclosure.

Figure 7A:
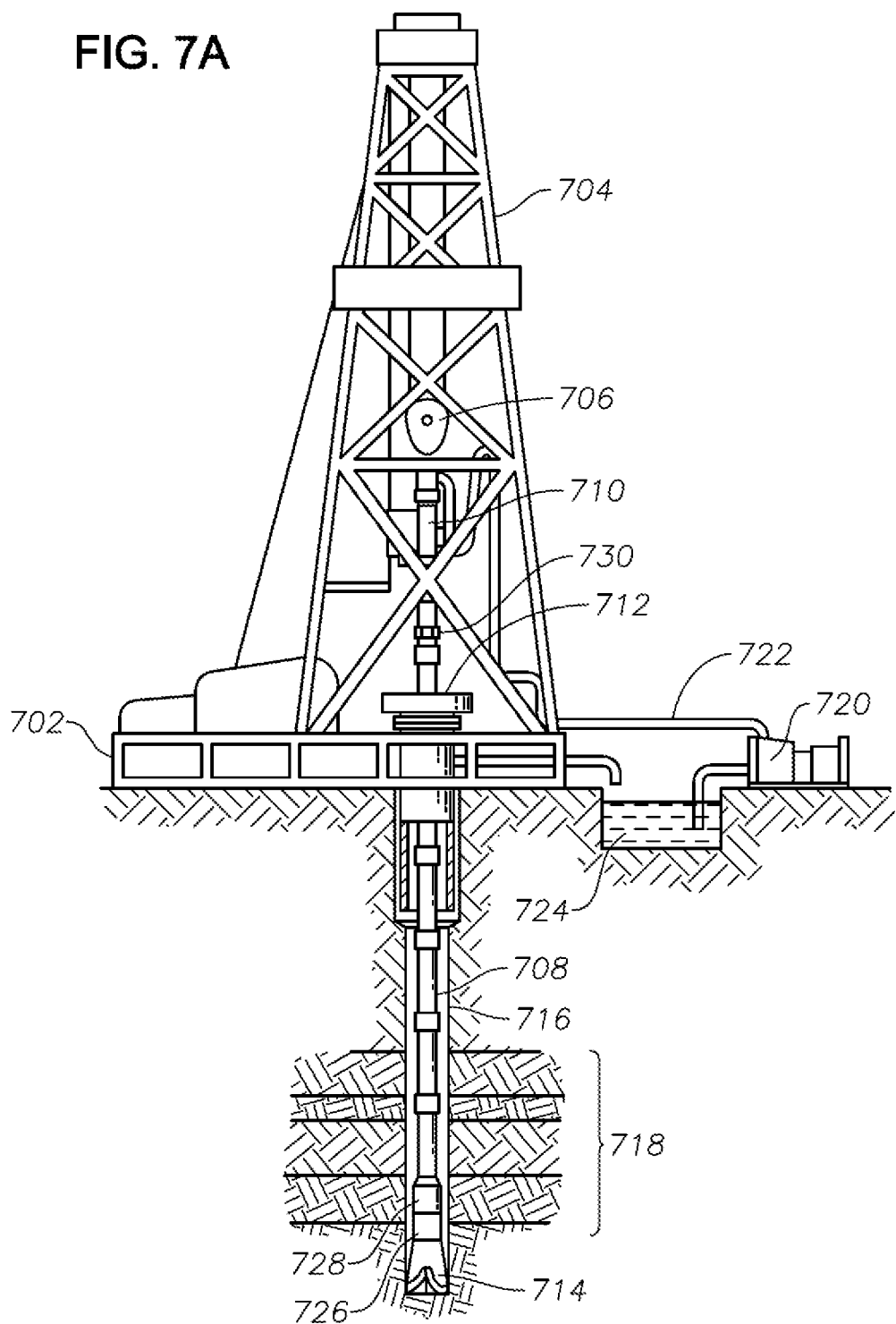
FIGS. 7A and 7B illustrate a Fabry-Perot based optical computing device or temperature sensor utilized in a logging-while-drilling or wireline application, respectively.

As previously described, the Fabry-Perot based optical computing devices and temperature sensors may be utilized in a variety of applications including, for example, downhole applications as part of a reservoir interrogation system. FIG. 7A illustrates a Fabry-Perot based optical computing device or temperature sensor utilized in a logging-while-drilling ("LWD") application. FIG. 7A illustrates a drilling platform 702 equipped with a derrick 704 that supports a hoist 706 for raising and lowering a drill string 708. Hoist 706 suspends a top drive 710 suitable for rotating drill string 708 and lowering it through well head 712. Connected to the lower end of drill string 708 is a drill bit 714. As drill bit 714 rotates, it creates a wellbore 716 that passes through various layers of a formation 718. A pump 720 circulates 705 drilling fluid through supply pipe 722 to top drive 710, down through the interior of drill string 708, through orifices in drill bit 714, back to the surface via the annulus around drill string 708, and into a retention pit 724. The drilling fluid transports cuttings from the borehole into pit 724 and aids in maintaining the integrity of wellbore 716. Various materials can be used for drilling fluid, 710 including, but not limited to, a salt-water based conductive mud.

A reservoir interrogation system 726 (e.g., Fabry-Perot based optical computing device or temperature sensor) is integrated into the bottom-hole assembly near the bit 714. In this illustrative embodiment, reservoir interrogation system 726 is an LWD tool; however, in other illustrative embodiments, reservoir interrogation system 726 may be utilized in a wireline or tubing-conveyed logging application. Nevertheless, as drill bit 714 extends wellbore 716 through formations 718, reservoir interrogation system 726 collects data related to sample characteristics and/or downhole temperature as described herein. In certain embodiments, reservoir interrogation system 726 may take the form of a drill collar, i.e., a thick-walled tubular that provides weight and rigidity to aid the drilling process. A telemetry sub 728 may be included to transfer images and measurement data/signals to a surface receiver 730 and to receive commands from the surface. In some embodiments, telemetry sub 728 does not communicate with the surface, but rather stores data for later retrieval at the surface when the logging assembly is recovered.

Still referring to FIG. 7A, reservoir interrogation system 726 includes a system control center (not shown), along with necessary processing/storage/communication circuitry, that is utilized to acquire sample characteristic and/or temperature measurement signals. In certain embodiments, once the measurement signals are acquired, the system control center calibrates the measurement signals and communicates the data back uphole and/or to other assembly components via telemetry sub 728. In an alternate embodiment, the system control center may be located at a remote location away from reservoir interrogation system 726, such as the surface or in a different borehole, and performs the processing accordingly.

Figure 7B:
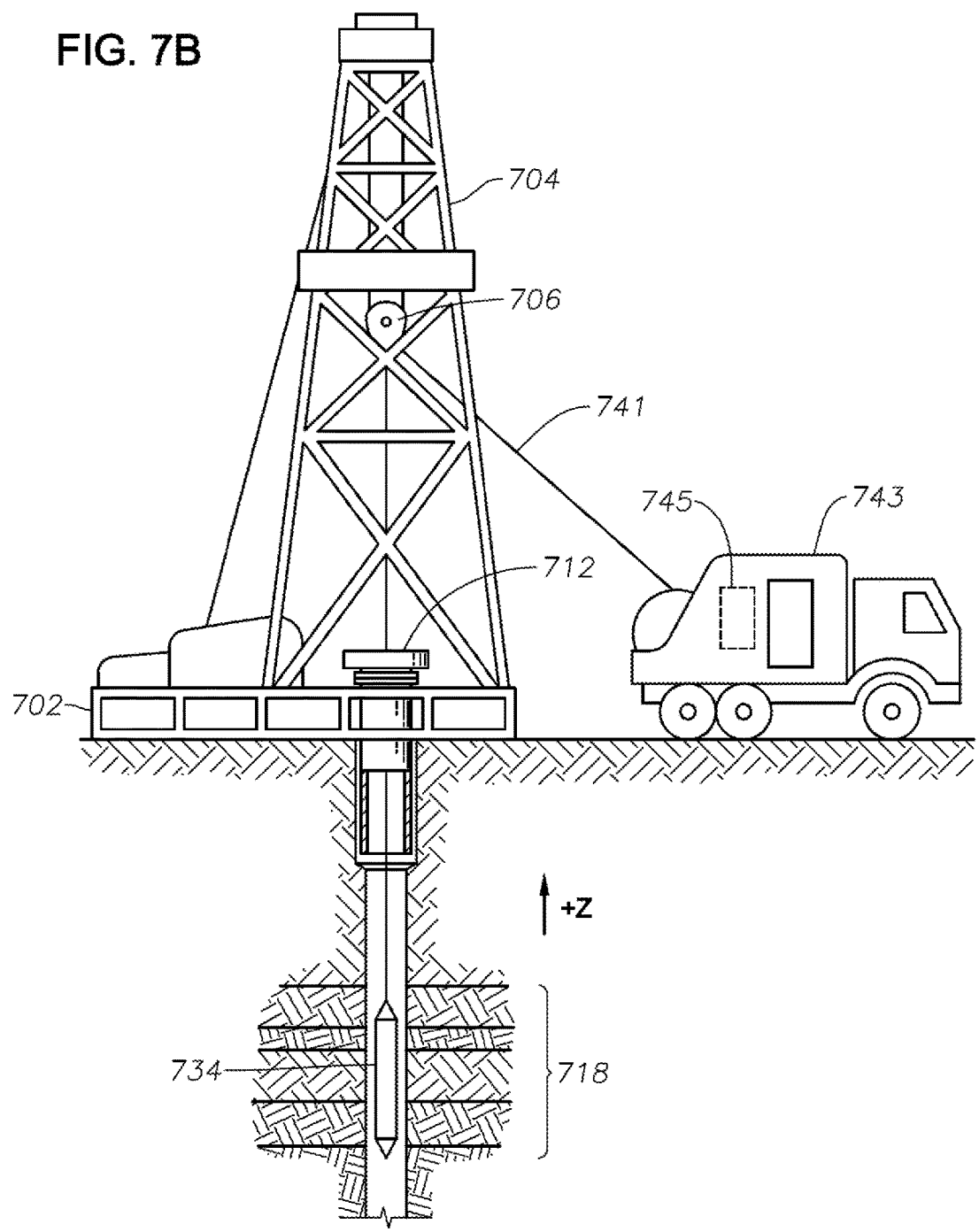

FIG. 7B illustrates an alternative embodiment of the present disclosure whereby the Fabry-Perot based optical computing device and/or temperature sensor is deployed in a wireline application. At various times during the drilling process, drill string 708 may be removed from the borehole as shown in FIG. 7B. Once drill string 708 has been removed, logging operations can be conducted using a wireline logging sonde 734, i.e., a probe suspended by a cable 741 having conductors for transporting power to the sonde and telemetry from the sonde to the surface (forming part of the reservoir interrogation system). Wireline sonde 734 may comprise one or more of a Fabry-Perot based optical computing device or temperature sensor, as described herein. A wireline logging sonde 734 may have pads and/or centralizing springs to maintain the tool near the axis of the borehole as the tool is pulled uphole. Logging sonde 734 can include a variety of other sensors including tools for measuring formation resistivity. A logging facility 743 collects sample characteristic, temperature or other measurements from the logging sonde 734, and includes a computer system 745 for processing and storing the measurements gathered by the sensors.

Accordingly, the illustrative embodiments and methods described herein provide Fabry-Perot based optical computing devices and temperature sensors for use in a variety of applications, including downhole uses whereby in-situ fluid analysis and temperature detection is provided. A number of advantages are provided as well. For example, the MEMS building blocks provide a broad spectral range; the fixed distance Fabry Perot building blocks are rugged and temperature insensitive; the optical devices described herein may be used as a spectrometer and a temperature sensor; and the devices may be used in tandem with ICEs to detect the composition of downhole fluids\gases\solids.

Embodiments described herein further relate to any one or more of the following paragraphs:

1. A Fabry-Perot based temperature sensor, comprising a Fabry-Perot cavity, comprising a first reflective plate; and a second reflective plate having a temperature sensitive layer positioned thereon, wherein the temperature sensitive layer is positioned to optically interact with electromagnetic radiation to produce a first reflected light, wherein the second reflective plate is positioned to optically interact with the electromagnetic radiation to produce a second reflected light; and a detector positioned to measure the first and second reflected lights and generated a first and second signal utilized to determine temperature.

2. A Fabry-Perot based temperature sensor as defined in paragraph 1, wherein the first and second reflective plates are positioned in a step-like fashion relative to one another, such that portions of the first reflective plate are separated from the second reflective plate by different distances.

3. A Fabry-Perot based temperature sensor as defined in paragraphs 1 or 2, further comprising a bandpass filter positioned to optically interact with the first and second reflected lights to thereby generate spectrally filtered first and second reflected lights.

4. A Fabry-Perot based temperature sensor as defined in any of paragraphs 1-3, further comprising a signal processor communicably coupled to the detector to determine the temperature.

5. A Fabry-Perot based temperature sensor as defined in any of paragraphs 1-4, wherein the temperature is determined based upon a phase difference between the first and second signals.

6. A Fabry-Perot based temperature sensor as defined in any of paragraphs 1-5, wherein the first reflective plate further comprises one or more micro-electromechanical system ("MEMS") building blocks.

7. A Fabry-Perot based temperature sensor as defined in any of paragraphs 1-6, further comprising a voltage source connected to the MEMS building blocks to thereby alter the distance between the first and second reflective plates.

8. A Fabry-Perot based temperature sensor as defined in any of paragraphs 1-7, further comprising an Integrated Computational Element ("ICE") array positioned to optically interact with the electromagnetic radiation to produce optically-interacted light which mimics a regression vector of the sample characteristic of interest; a bandpass filter positioned to optically interact with the optically-interacted light to produce filtered optically-interacted light; and a detector positioned to measure the optically-interacted light and produce a third signal utilized to determine the sample characteristic of interest.

9. A Fabry-Perot based temperature sensor as defined in any of paragraphs 1-8, wherein the temperature sensor comprises part of a downhole reservoir interrogation system.

10. A Fabry-Perot based temperature sensing method, comprising optically interacting electromagnetic radiation with a sample to produce sample-interacted light; optically interacting the sample-interacted light with a Fabry-Perot cavity to produce optically-interacted light; detecting the optically-interacted light and thereby generating a signal; and utilizing the signal to determine temperature.

11. A Fabry-Perot based temperature sensing method as defined in paragraph 10, wherein the Fabry-Perot cavity comprises: a first reflective plate; and a second reflective plate having a temperature sensitive layer positioned thereon; and optically interacting the sample-interacted light with the Fabry-Perot cavity comprises: optically interacting the sample-interacted light with the temperature sensitive layer to produce a first reflected light; and optically interacting the sample-interacted light with the second reflective plate to produce a second reflected light, wherein the first and second reflected lights are utilized to determine the temperature.

12. A Fabry-Perot based temperature sensing method as defined in paragraphs 10 or 11, wherein optically interacting the sample-interacted light with the Fabry-Perot cavity comprises optically-interacting the sample-interacted light with a stepped profile of the first reflective plate to produce second optically-interacted light that mimics a regression vector of a sample characteristic of interest, the second optically-interacted light being utilized to determine the sample characteristic of interest.

13. A Fabry-Perot based temperature sensing method as defined in any of paragraphs 10-12, wherein optically interacting the sample-interacted light with the Fabry-Perot cavity comprises utilizing micro-electromechanical system ("MEMS") building blocks to alter a distance between the first and second reflective plate of the Fabry-Perot cavity to thereby produce second optically-interacted light that mimics a regression vector of a sample characteristic of interest, the second optically-interacted light being utilized to determine the sample characteristic of interest.

14. A Fabry-Perot based temperature sensing method as defined in any of paragraphs 10-13, further comprising optically interacting the sample-interacted light with an Integrated Computational Element ("ICE") array to produce second optically-interacted light that mimics a regression vector of a sample characteristic of interest; detecting the second optically-interacted light and generating a second signal which corresponds to the sample characteristic of interest; and determining the sample characteristic of interest using the second signal.

15. A Fabry-Perot based temperature sensing method as defined in any of paragraphs 10-14, wherein optically interacting the sample-interacted light with the ICE array comprises optically interacting the second optically-interacted light with a bandpass filter array to produce filtered second optically-interacted light, the filtered second optically-interacted light being detected.

16. A Fabry-Perot based temperature sensing method as defined in any of paragraphs 10-15, wherein the temperature is determined based upon a phase difference between the first and second reflective lights.

17. A Fabry-Perot based temperature sensing method as defined in any of paragraphs 10-16, wherein the temperature is determined using a signal processor.

18. A Fabry-Perot based temperature sensing method as defined in any of paragraphs 10-17, wherein the temperature sensing method is performed using a temperature sensor deployed as part of a downhole reservoir interrogation system.

Moreover, the foregoing paragraphs and other methods described herein may be embodied within a system comprising processing circuitry to implement any of the methods, or a in a non-transitory computer-program product or readable medium comprising instructions which, when executed by at least one processor, causes the processor to perform any of the methods described herein.

Although various embodiments and methods have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A Fabry-Perot based temperature sensor, comprising:
   a Fabry-Perot cavity, comprising:
      a first reflective plate having one or more micro-electromechanical system ("MEMS") building blocks; and
      a second reflective plate having a temperature sensitive layer positioned thereon,
      wherein the temperature sensitive layer is positioned to optically interact with electromagnetic radiation to produce a first reflected light,
      wherein the second reflective plate is positioned to optically interact with the electromagnetic radiation to produce a second reflected light; and
   a detector positioned to measure the first and second reflected lights and generated a first and second signal utilized to determine temperature.

2. A Fabry-Perot based temperature sensor as defined in claim 1, wherein the first and second reflective plates are positioned in a step-like fashion relative to one another, such that portions of the first reflective plate are separated from the second reflective plate by different distances.

3. A Fabry-Perot based temperature sensor as defined in claim 1, further comprising a bandpass filter positioned to optically interact with the first and second reflected lights to thereby generate spectrally filtered first and second reflected lights.

4. A Fabry-Perot based temperature sensor as defined in claim 1, further comprising a signal processor communicably coupled to the detector to determine the temperature.

5. A Fabry-Perot based temperature sensor as defined in claim 4, wherein the temperature is determined based upon a phase difference between the first and second signals.

6. A Fabry-Perot based temperature sensor as defined in claim 1, further comprising a voltage source connected to the MEMS building blocks to thereby alter the distance between the first and second reflective plates.

7. A Fabry-Perot based temperature sensor as defined in claim 1, further comprising:
 an Integrated Computational Element ("ICE") array positioned to optically interact with the electromagnetic radiation to produce optically-interacted light which mimics a regression vector of the sample characteristic of interest;
 a bandpass filter positioned to optically interact with the optically-interacted light to produce filtered optically-interacted light; and
 a detector positioned to measure the optically-interacted light and produce a third signal utilized to determine the sample characteristic of interest.

8. A Fabry-Perot based temperature sensor as defined in claim 1, wherein the temperature sensor comprises part of a downhole reservoir interrogation system.

9. A Fabry-Perot based temperature sensing method, comprising:
 optically interacting electromagnetic radiation with a sample to produce sample-interacted light;
 optically interacting the sample-interacted light with a Fabry-Perot cavity to produce optically-interacted light, the Fabry-Perot cavity having a first reflective plate and a second reflective plate having a temperature sensitive layer positioned thereon, wherein micro-electromechanical system ("MEMS") building blocks are used to alter a distance between the first and second reflective plate of the Fabry-Perot cavity to thereby produce second optically-interacted light that mimics a regression vector of a sample characteristic of interest, the second optically-interacted light being utilized to determine the sample characteristic of interest;
 detecting the optically-interacted light and thereby generating a signal; and
 utilizing the signal to determine temperature.

10. A Fabry-Perot based temperature sensing method as defined in claim 9, wherein
 optically interacting the sample-interacted light with the Fabry-Perot cavity comprises:
  optically interacting the sample-interacted light with the temperature sensitive layer to produce a first reflected light; and
  optically interacting the sample-interacted light with the second reflective plate to produce a second reflected light,
  wherein the first and second reflected lights are utilized to determine the temperature.

11. A Fabry-Perot based temperature sensing method as defined in claim 10, wherein optically interacting the sample-interacted light with the Fabry-Perot cavity comprises optically-interacting the sample-interacted light with a stepped profile of the first reflective plate to produce second optically-interacted light that mimics a regression vector of a sample characteristic of interest, the second optically-interacted light being utilized to determine the sample characteristic of interest.

12. A Fabry-Perot based temperature sensing method as defined in claim 9, further comprising:
 optically interacting the sample-interacted light with an Integrated Computational Element ("ICE") array to produce second optically-interacted light that mimics a regression vector of a sample characteristic of interest;
 detecting the second optically-interacted light and generating a second signal which corresponds to the sample characteristic of interest; and
 determining the sample characteristic of interest using the second signal.

13. A Fabry-Perot based temperature sensing method as defined in claim 12, wherein optically interacting the sample-interacted light with the ICE array comprises optically interacting the second optically-interacted light with a bandpass filter array to produce filtered second optically-interacted light, the filtered second optically-interacted light being detected.

14. A Fabry-Perot based temperature sensing method as defined in claim 10, wherein the temperature is determined based upon a phase difference between the first and second reflective lights.

15. A Fabry-Perot based temperature sensing method as defined in claim 9, wherein the temperature is determined using a signal processor.

16. A Fabry-Perot based temperature sensing method as defined in claim 9, wherein the temperature sensing method is performed using a temperature sensor deployed as part of a downhole reservoir interrogation system.

17. A Fabry-Perot based temperature sensor, comprising:
 a Fabry-Perot cavity, comprising:
  a first reflective plate; and
  a second reflective plate having a temperature sensitive layer positioned thereon,
  wherein the temperature sensitive layer is positioned to optically interact with electromagnetic radiation to produce a first reflected light,
  wherein the second reflective plate is positioned to optically interact with the electromagnetic radiation to produce a second reflected light;
 a detector positioned to measure the first and second reflected lights and generated a first and second signal utilized to determine temperature;
 an Integrated Computational Element ("ICE") array positioned to optically interact with the electromagnetic radiation to produce optically-interacted light which mimics a regression vector of the sample characteristic of interest;
 a bandpass filter positioned to optically interact with the optically-interacted light to produce filtered optically-interacted light; and
 a detector positioned to measure the optically-interacted light and produce a third signal utilized to determine the sample characteristic of interest.

18. A Fabry-Perot based temperature sensor as defined in claim 17, wherein the temperature sensor comprises part of a downhole reservoir interrogation system.

19. A Fabry-Perot based temperature sensor, comprising:
 a Fabry-Perot cavity, comprising:
  a first reflective plate; and a second reflective plate having a temperature sensitive layer positioned thereon, wherein the temperature sensitive layer is positioned to optically interact with electromagnetic radiation to produce a first reflected light, wherein the second reflective plate is positioned to optically interact with the electromagnetic radiation to produce a second reflected light;

wherein the first and second reflective plates are positioned in a step-like fashion relative to one another, such that portions of the first reflective plate are separated from the second reflective plate by different distances to produce a third reflected light that mimics a regression vector of a sample characteristic of interest, the third reflected light being utilized to determine the sample characteristic of interest; and a detector positioned to measure the first and second reflected lights and generated a first and second signal utilized to determine temperature.

20. A Fabry-Perot based temperature sensor as defined in claim 19, wherein the temperature sensor comprises part of a downhole reservoir interrogation system.

21. A Fabry-Perot based temperature sensing method, comprising:

optically interacting electromagnetic radiation with a sample to produce sample-interacted light;

optically interacting the sample-interacted light with a Fabry-Perot cavity to produce optically-interacted light, the Fabry-Perot cavity having a first reflective plate and a second reflective plate having a temperature sensitive layer positioned thereon, wherein optically interacting the sample-interacted light with the Fabry-Perot cavity comprises optically-interacting the sample-interacted light with a stepped profile of the first reflective plate to produce second optically-interacted light that mimics a regression vector of a sample characteristic of interest, the second optically-interacted light being utilized to determine the sample characteristic of interest;

detecting the optically-interacted light and thereby generating a signal; and utilizing the signal to determine temperature.

22. A Fabry-Perot based temperature sensing method as defined in claim 21, wherein the temperature sensing method is performed using a temperature sensor deployed as part of a downhole reservoir interrogation system.

23. A Fabry-Perot based temperature sensing method, comprising:

optically interacting electromagnetic radiation with a sample to produce sample-interacted light;

optically interacting the sample-interacted light with a Fabry-Perot cavity to produce optically-interacted light;

optically interacting the sample-interacted light with an Integrated Computational Element ("ICE") array to produce second optically-interacted light that mimics a regression vector of a sample characteristic of interest;

detecting the optically-interacted light and thereby generating a signal;

detecting the second optically-interacted light and generating a second signal which corresponds to the sample characteristic of interest;

determining temperature using the signal; and determining the sample characteristic of interest using the second signal.

24. A Fabry-Perot based temperature sensing method as defined in claim 23, wherein the temperature sensing method is performed using a temperature sensor deployed as part of a downhole reservoir interrogation system.

* * * * *